United States Patent
Osman

Patent Number: 5,473,029
Date of Patent: * Dec. 5, 1995

[54] PROCESS FOR PREPARING BUTYL POLYMERS WITH ALLYLIC HALIDE FUNCTIONALITY

[75] Inventor: Akhtar Osman, Sarnia, Canada

[73] Assignee: Bayer Rubber Inc., Sarnia, Canada

[*] Notice: The portion of the term of this patent subsequent to Aug. 30, 2011, has been disclaimed.

[21] Appl. No.: 213,658

[22] Filed: Mar. 15, 1994

Related U.S. Application Data

[63] Continuation-in-part of Ser. No. 14,295, Feb. 5, 1993, Pat. No. 5,342,908.

[51] Int. Cl.⁶ .................................................. C08F 4/16
[52] U.S. Cl. .................................................. 526/135
[58] Field of Search ................................ 526/135, 142, 526/144

[56] References Cited

U.S. PATENT DOCUMENTS 3,067,182  12/1962  Jones .
3,299,020  1/1967  Hunter et al. .
4,074,035  2/1978  Powers et al. .

OTHER PUBLICATIONS

Sadykh—Zade et al in Dokl.Akad.Nauk.Azerb. SSR 1968, 24(6) pp. 20–23 (Chem. Abstr. 70, 20786j).

*Primary Examiner*—Christopher Henderson
*Attorney, Agent, or Firm*—Joseph C. Gil; Godfried R. Akorli

[57] ABSTRACT

A halogenated butyl rubber is prepared by a process wherein a monomer charge comprising isobutylene and conjugated diolefin having the formula

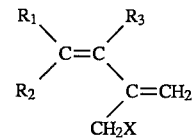

wherein $R_1$, $R_2$ and $R_3$ which may be the same or different are a methyl group or a hydrogen atom and X is bromine or chlorine together with an initiator having the formula

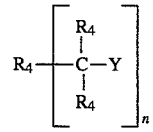

wherein each $R_4$ is an alkyl, aryl or aralkyl group, Y is preferably an alkoxy, hydroxy, carboxyl or halide, and n is a positive whole number from 1 to 3 are introduced into a suitable reaction vessel in a specified ratio at a temperature of from about −90° to −10° C., a solution of a Lewis acid is added and the monomers are copolymerized at said temperature to form said halogenated butyl rubber, and the halogenated rubber is recovered from solution.

12 Claims, No Drawings

PROCESS FOR PREPARING BUTYL POLYMERS WITH ALLYLIC HALIDE FUNCTIONALITY

This application is a continuation-in-part of application Ser. No. 08/014,295 filed Feb. 5, 1993 now U.S. Pat. No. 5,342,908, issued Aug. 30, 1994.

FIELD OF INVENTION

This invention relates to a process for the preparation of halogenated butyl rubbers. More particularly, the present invention relates to a process whereby halogenated-type rubbers may be prepared directly by the copolymerization of the appropriate monomers.

BACKGROUND OF THE INVENTION

The expression "butyl rubber" as employed herein is defined to include a copolymer of a $C_4$ to $C_6$ isolefin, preferably isobutylene, and a $C_4$ to $C_8$ conjugated diolefin, preferably isoprene. A preferred butyl rubber contains from about 97 to about 99.5 weight percent of isobutylene and from about 0.5 to about 3 weight percent of isoprene.

The processes used to prepare butyl rubber are well known in the art. Commercially butyl rubber is prepared in a low temperature cationic polymerization process using Lewis acid type catalysts of which a typical example is aluminum trichloride. The process used most extensively employs methyl chloride as the diluent for the reaction mixture and the polymerization is conducted at temperatures of the order of less than −90° C., the polymer produced thereby being obtained as a slurry. However, it is also possible to conduct such polymerizations in a diluent which is a solvent for the polymer produced, examples of such diluents being the hydrocarbons pentane, hexane, heptane and mixtures of the aforementioned solvents with one another or with methyl chloride and/or methylene chloride. Recovery of the butyl rubber is achieved by conventional techniques used to recover rubbery polymers.

Halogenated butyl rubber which can be either brominated butyl rubber or chlorinated butyl rubber is produced by the bromination or chlorination of the aforementioned butyl rubber. Brominated butyl rubber (bromobutyl rubber) typically contains from about 1 to about 3 weight percent of isoprene and from about 97 to about 99 weight percent of isobutylene, based on the hydrocarbon content of the rubber, and from about 1 to about 4 weight percent of bromine, based on the bromobutyl rubber. Chlorobutyl rubber typically contains from about 1 to about 3 weight percent of isoprene and from about 97 to about 99 weight percent of isobutylene, based on the hydrocarbon content of the rubber and from about 0.5 to about 2.5 weight percent of chlorine, based on the chlorobutyl rubber.

Commercially halogenation of the butyl rubber is carried out in a hydrocarbon solution such as hexane using elemental chlorine or bromine in a 1:1 molar ratio relative to the enchained isoprene in the butyl feedstock. In the process the solution of butyl rubber of the desired molecular weight and mole percent unsaturation is treated with chlorine or bromine at a temperature of from about 40 to about 65° C. in one or more highly agitated reaction vessels, the chlorine being introduced as a gas or in dilute solution because of its rate of reaction with butyl rubber. Because of its lower rate of reaction bromine may be used in liquid or gaseous form. The hydrochloric or hydrobromic acid generated during the halogenation is neutralized with dilute aqueous base and the aqueous layer is subsequently removed by settling. Antioxidant or stabilizers are then added and the halogenated butyl rubber is then recovered in a manner similar to that used to recover butyl rubber.

Investigations of the molecular structure of the halogenated butyl rubbers have shown that in current commercial halogenation procedures a number of allylic halides are produced, the major halogenated isomer produced both in the case of chlorobutyl rubber and bromobutyl rubber being the exomethylene allylic halide isomer.

It is believed that these allylic halide structures in the halogenated butyl rubbers are the reason why the halogenated butyl rubbers exhibit enhanced cure compatibility with highly unsaturated elastomeric materials such as natural rubber, styrene-butadiene rubbers, polybutadiene rubbers and the like relative to butyl rubber.

In view of the foregoing it would be advantageous if halogenated polymers with allylic halide functionality analogous to the halogenated butyl rubbers could be synthesized directly by the copolymerization of the appropriate monomers thereby leading to a reduction in costs associated with the process of halogenating butyl rubber.

DESCRIPTION OF THE PRIOR ART

U.S. Pat. No. 3,067,182 (Giffin to Dow) discloses the copolymerization of from about 70 to about 99 mole percent of isobutylene with about from 1 to about 30 mole percent of isopropenylbenzyl chloride, preferably the para isomer, in an inert solvent using a Friedel-Crafts catalyst and a temperature below about −50° C. to afford a uniform copolymer having reactive benzylic chloride groups.

U.S. Pat. No. 3,299,020 (Hunter et al to Esso) discloses a process for the copolymerization of an olefin with an allyl halide comprising forming a first solution by mixing 5 to 25 parts of methallyl chloride and the like with 95 to 75 parts of an alkyl halide solvent such as methyl chloride, methylene chloride and ethyl chloride at a temperature of from about −5° to about −40° C. and adding thereto a Friedel-Crafts catalyst chosen from the group consisting of boron chloride, aluminum chloride, aluminum bromide and stannic chloride until a strong colour develops; forming a second solution comprising 10 to 35 parts by weight of an olefin and 65 to 90 parts by weight of an alkyl halide; and reacting said second solution with said first solution thereby providing a copolymer of high molecular weight and a high intrinsic viscosity. The copolymer obtained by the aforesaid process does not have allylic halide functionality and thus will not exhibit the enhanced cure compatibility that the halogenated butyl rubbers exhibit with highly unsaturated elastomeric materials.

Sadykh-Zade et al in Dokl.Akad. Nauk Azerb. SSR 1968, 24(6) pages 20–23 (Chem. Abstr. 70, 20786j) state that chlorobutyl rubber may be prepared under conditions suitable for butyl rubber synthesis by copolymerizing (1) isobutylene and methallyl chloride in methyl chloride; (2) isobutylene, isoprene and methallyl chloride in methyl chloride; and (3) isobutylene and 2-chloromethyl-1,3-butadiene in methyl chloride, using aluminum chloride as catalyst. Copolymers containing up to two percent chlorine are reported to be obtained.

U.S. Pat. No. 4,074,035 (Powers et al to Exxon) discloses a continuous process for the preparation of gel-free interpolymers comprised of isobutylene and a mixture of from 0.5 to 5.0 mole percent meta- and para-chloromethyl styrene which consists of:

(a) continuously feeding the monomers in the range of about 2 to about 20 parts by weight, from about 80 to about 98 parts by weight of a solvent in which the monomers and the interpolymers are soluble and from about 0.001 to about 0.05 parts by weight of a catalyst selected from the group consisting of ethyl aluminum dichloride, ethyl aluminum sesquichloride, diethyl aluminum chloride, or boron trifluoride to a reaction zone maintained at a temperature in the range of about $-120°$ C. to about $-20°$ C. to form a reaction mixture;

(b) maintaining the reaction mixture in the reaction zone at the temperature for a time sufficient to convert at least one of the monomers to the interpolymer in an amount equal to or greater than about 85 percent; and (c) recovering the interpolymer.

SUMMARY OF THE INVENTION

It is an objective of this invention to provide a process whereby polyisobutylene-based polymers bearing allylic halide functionality analogous to halogenated butyl rubbers may be prepared directly by the copolymerization of the appropriate monomers.

Accordingly, our invention provides a process for the preparation of a halogenated polymer analogous to halogenated rubber comprising the steps of:

(A) introducing into a suitable reaction vessel a monomer charge comprising from about 80 to about 95 weight percent of isobutylene and from about 5 to about 20 weight percent of a conjugated diolefin bearing an allylic halide moiety characterized in that said conjugated diolefin bearing an allylic halide moiety has the formula

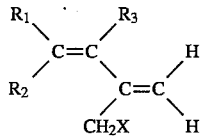

wherein $R_1$, $R_2$ and $R_3$ are selected from the group consisting of hydrogen and methyl groups and may be the same or different and X is selected from the group consisting of chlorine and bromine based on a total of 100 weight percent of said isobutylene and conjugated diolefin bearing an allylic halide moiety, and an initiator having the formula

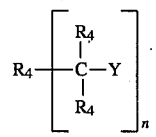

wherein each $R_4$ may be the same or different and is an alkyl, aryl or aralkyl group of 1 to 8 carbon atoms, Y is a carboxyl, alkoxyl, hydroxyl, halogen hydroperoxide, peroxide or peroxy ester group and n is a positive whole number from 1 to 3 in an amount of from about $1\times10^{-5}$ to about $1\times10^{-3}$ moles per mole of said isobutylene at a temperature of from about $-90°$ C. to about $-10°$ C.

(B) adding a solution of from about $1\times10^{-4}$ to about $5\times10^{-2}$ moles of a Lewis acid per mole of isobutylene in an organic solvent to the reaction mixture of (A) at said temperature and polymerizing the monomers to form said halogenated butyl rubber, and (C) recovering the halogenated butyl rubber from the solution.

DETAILED DESCRIPTION OF THE INVENTION

This invention is based upon the discovery that the copolymerization of isobutylene with an allylic halide substituted conjugated diolefin having a particular molecular structure under certain specific polymerization conditions permits the direct production of halogenated polymers with allylic halide functionality analogous to halogenated butyl rubbers.

The monomer charge suitable for the practice of this invention comprises from about 80 to about 95 weight percent of isobutylene and from about 5 to about 20 weight percent of a conjugated diolefin bearing an allylic halide moiety based on a total of 100 weight percent of said isobutylene and said conjugated diolefin bearing an allylic halide moiety. The aforementioned conjugated diolefin is characterized in that it has the formula:

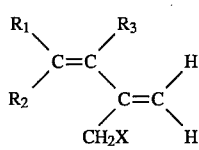

wherein $R_1$, $R_2$ and $R_3$ are selected from the group consisting of hydrogen and methyl groups and may be the same or different and X is selected from the group consisting of chlorine and bromine. Illustrative non-limiting examples of conjugated diolefins bearing an allylic halide moiety that are suitable for use in the present invention include 2-chloromethyl-4-methyl-1,3-pentadiene, 2-bromomethyl-4-methyl-1,3-pentadiene, 2-chloromethyl-3,4-dimethyl-1,3-pentadiene, 2-chloromethyl-1,3-butadiene and 2-bromomethyl-1,3-butadiene, 2-chloromethyl-4-methyl-1,3-pentadiene, 2-bromomethyl-4-methyl-1,3-pentadiene and 2-chloromethyl-3,4-dimethyl-1,3-pentadiene being preferred, and 2-chloromethyl-4-methyl-1,3-pentadiene being the monomer of choice. These compounds may generally be prepared by the pyrolysis of an appropriately substituted 2,5-dihydrothiophene-1,1-dioxide. For the sake of illustrative purposes, the preparation of 2-chloromethyl-4-methyl-1,3-pentadiene involves the pyrolysis of 3-chloromethyl-5,5-dimethyl-2,5-dihydrothiophene-1,1-dioxide, the dioxide being prepared by a multistep sequence involving the reduction of 3-carboethoxy-5,5-dimethyl-2, 5-dihydrothiophene with lithium aluminum hydride to the corresponding hydromethyl compound, subsequent chlorination with a mixture of triphenyl phosphine in carbon tetrachloride and then oxidation of the chloromethyl compound with m-chloroperbenzoic acid.

The monomer charge suitable for use in the process of the present invention may further comprise a conjugated diolefin having from 4 to 8 carbon atoms in an amount of from about $1\times10^{-2}$ moles to about $1\times10^{-1}$ moles per mole of isobutylene. Preferably the conjugated diolefin is isoprene.

The initiator suitable for use in the process disclosed herein has the formula

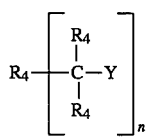

wherein each $R_4$ may be the same or different and is an alkyl, aryl, or aralkyl group of 1 to 8 carbon atoms, Y is a carboxyl, alkoxyl, hydroxyl, halogen, hydroperoxide, peroxide or peroxy ester group and n is a positive whole number from 1 to 3 and the initiator is used in an amount of from about $1\times10^{-5}$ to about $1\times10^{-3}$ moles per mole of isobutylene. Illustrative non-limiting examples of suitable initiators include 1,4-di(2-methoxy-2-propyl) benzene, 1,3,5-tri(2-methoxy-2-propyl) benzene, 1,4-di(2-chloro-2-propyl) benzene, 1,3,5-tri(2-chloro-2-propyl) benzene, 2,6-dichloro- 2,4,4,6-tetramethylheptane, 1,4-di(2-hydroxyl-2-propyl) benzene, 2,6-dihydroxyl-2,4,4,6-tetramethylheptane, 2,5-dimethyl-2,5-di(t-butylperoxy) hexane, 2,5-dimethyl-2,5-di(t-butylperoxy) hexyne-3, 2,5-di(hydroperoxy)-2,5-dimethylhexane, 2,7-di(hydroperoxy)-2, 7-dimethyl octane, 1,4-di(2-hydroperoxide-2-propyl) benzene and 2,5-dimethyl-2,5-bis(benzoylperoxy) hexane. The preferred initiators are selected from the group consisting of 2,5-dimethyl-2,5-bis(benzoylperoxy hexane, 1,4-di(2-methoxy-2-propyl) benzene and 1,3,5-tri(2-methoxy-2-propyl) benzene, most preferably the initiators are selected from 2,5-dimethyl-2,5-bis(benzoyl peroxy) hexane and 1,4-di(2-methoxy-2-propyl) benzene.

A number of Lewis acids are suitable for use in the process disclosed herein. Non-limiting examples include boron trichloride, boron trifluoride, aluminum trichloride, stannic tetrachloride, titanium tetrachloride, antimony pentafluoride and vanadium tetrachloride, with the Lewis acids of preference being boron trichloride and titanium tetrachloride. The amount of Lewis acid used relative to the amount of the initiator is not particularly critical. However, in order to be able to achieve more readily a polymer of the desired molecular weight, it is preferred that the mole amount of Lewis acid used is equal to or greater than the mole amount of the initiator used. Generally, it is preferred to use from about $1\times10^{-4}$ to about $5\times10^{-2}$ moles of a Lewis acid per mole of isobutylene.

In the process of this invention, the Lewis acid is employed as a solution in a low freezing non-complex forming solvent selected from the group consisting of $C_1$ to $C_4$ halogenated hydrocarbons. Preferably, the solvent is selected from one of methyl chloride and methylene chloride.

The inert organic solvents suitable for use in the commercial butyl rubber polymerizations mentioned previously are also suitable for use as the solvent for the monomer charge and the initiator in the process of the present invention. Preferred inert organic solvents include $C_1$ to $C_4$ halogenated hydrocarbons and mixtures thereof, $C_5$ to $C_8$ aliphatic hydrocarbons, $C_5$ to $C_8$ cyclic hydrocarbons, mixtures of one or more said halogenated hydrocarbons and one or more of said aliphatic hydrocarbons and mixtures of one or more said halogenated hydrocarbons and one or more of said cyclic hydrocarbons. Most preferably the inert organic solvent is selected from the group consisting of methyl chloride, methylene chloride, hexane, methylcyclohexane, cyclopentane and mixtures thereof.

While the order of addition of the monomer charge, the initiator, the Lewis acid and the inert organic solvent (if used) is not critical to the production of the polymers with allylic halide functionality, it is preferred that a suitable reaction vessel first be charged with the isobutylene and the conjugated diolefin bearing an allylic halide moiety (and the conjugated diolefin having from 4 to 8 carbon atoms if it forms part of the monomer charge), the initiator of choice and the inert organic solvent (if used) at a temperature of from about $-90°$ C. to about $-10°$ C. This is then followed by the addition of the solution of the Lewis acid in a halogenated hydrocarbon solvent to initiate the polymerization of the isobutylene and the conjugated diolefin bearing the allylic halide moiety (and the conjugated diolefin having from 4 to 8 carbon atoms if used). The monomers are polymerized at a temperature of from about $-90°$ C. to about $-10°$ C. to form a halogenated butyl rubber analogue.

The polymer produced according to the process disclosed herein may be recovered by conventional techniques used to recover rubbery polymers. Such techniques include for the higher molecular weight polymers, contacting the polymer solution or slurry with copious amounts of hot water thereby flashing the inert organic solvent and any unreacted monomer. The polymer-hot water slurry may then be passed through a tunnel dryer or drying extruder. In another such technique, especially for polymers produced in the presence of an inert organic solvent and having a number average molecular weight of less than about 30,000, the polymer is recovered by (i) contacting the polymer solution or slurry with steam or by applying a vacuum to the polymer solution or slurry to flash off the solvent and any unreacted monomer; (ii) extracting acidic impurities and any remaining high boiling diluents with methanol; and (iii) drying the purified polymer to remove traces of methanol. In yet another technique, especially for low molecular weight polymers, the polymer solution is contacted with excess water to remove inorganic residues, the solution is dried and the inert organic solvent is then removed, as by evaporation.

The products produced according to the process described herein are polymers bearing allylic halide functionality analogous to halogenated butyl rubbers. Evidence for the formation of such polymers is afforded by NMR spectroscopy. As an illustration the 250 $MH_z$ $^1H$ NMR spectrum of the product obtained upon the copolymerization of isobutylene with 2-chloromethyl- 4-methyl-1, 3-pentadiene exhibits a number of signals that can be attributed to two different structures being present in the polymer. For, a singlet at 3.95 ppm can be attributed to the methylene protons attached to the same carbon atom as the chlorine atom PIB(Cl$\underline{CH_2}$)C=CH PIB and a singlet at 5.3 ppm can be attributed to a single olefinic proton PIB(ClCH$_2$)C=$\underline{CH}$ PIB suggesting that the major structure in the copolymer arises from the 1,4-addition of 2-chloromethyl-4-methyl-1, 3-pentadiene monomer to the polyisobutylene cation. A minor structure in the copolymer appears to arise from 1,2-addition of the trisubstituted olefinic bond of the 2-chloromethyl-4-methyl-1, 3-pentadiene monomer to the polyisobutylene cation as a singlet at 4.0 ppm can be attributed to the methylene protons attached to the same carbon as the chlorine atom PIB(Cl $\underline{CH_2}$)C=CH$_2$ and the singlet at 5.2 ppm can be attributed to two olefinic protons attached to the same carbon atom of the olefinic bond PIB(ClCH$_2$)C=$\underline{CH_2}$.

While not wishing to be bound by any theories, it is believed that conjugated diolefins such as 2-chloromethyl-4-methyl-1,3-pentadiene wherein the olefinic bond that does not bear the allylic halide moiety bears at least two methyl substituents, that is at least both of $R_1$ and $R_2$ are methyl groups, upon copolymerization with isobutylene are incorporated into the copolymer to a greater extent relative to conjugated diolefins such as 2-chloromethyl-1,3-butadiene wherein the olefinic bond that does not bear the allylic halide moiety, is a terminal olefinic bond, in part because of the stabilization afforded the intermediate allylic cation by the methyl substituents. For this reason 2-chloromethyl-4-methyl-1,3-pentadiene, 2-bromomethyl-4-methyl-1,3-pentadiene and 2-chloromethyl-3,4-dimethyl-1,3-pentadiene are the monomers preferred for copolymerization with isobutylene, and 2-chloromethyl-4-methyl-1,3-pentadiene is the monomer of choice for the production of a chlorinated butyl rubber.

EXPERIMENTAL

1. Preparation of 2-Bromomethyl-1,3-Butadiene

A) Bromination of 3-methyl sulfolene

3-Methyl-2,5-dihydrothiophene-1,1-dioxide (50.0 g, 0.38 mol), N-bromo-succinimide (74.1 g, 0.42 mol) and chloroform (600 ml) were placed in a three-necked one liter round bottomed flask equipped with a mechanical overhead stirrer, a reflux condenser and a gas inlet. Argon gas was bubbled through the solution for 5 minutes and then benzoyl peroxide (4.60 g, 0.19 mol) was added and the mixture heated under reflux for eighteen hours during which time the solution first become orange in colour and then yellow. The solution was cooled to ambient temperature, washed with water (300 ml×5) to remove the succinimide, dried over anhydrous magnesium sulfate, filtered and concentrated under reduced pressure to afford a thick orange oil (11.4 g). The crude product was chromatographed using silica gel as the support and chloroform as the eluant and then recrystallized twice from 95 percent ethanol to give 3-bromomethyl-2,5 dihydrothiophene-1,1-dioxide. 9.6 g (12 percent yield). m.p. 76°–84° C., $^1$H NMR (300 MH$_z$, CDCl$_3$): 6.11 (brs 1H), 4.05 (s,2H), 3.88 (s,4H); $^{13}$C NMR (75 MH$_z$): 29.84, 56.53, 57.34, 122.28, 134.30.

B) Pyrolysis of 3-Bromomethyl-2,5-Dihydrothiophene-1,1-Dioxide

3-Bromomethyl-2,5-dihydrothiophene-1,1-dioxide (22.0 g, 0.10 mol) was placed in a 100 ml round-bottomed flask which was connected to a short-path still and the system was evacuated to 1.5 mm Hg pressure. The flask was lowered into an oil bath which had been preheated to a temperature of about 170° to about 190° C. while the receiver was cooled in a liquid nitrogen bath. After about 15 minutes the vacuum was released and the receiving flask was warmed to ambient temperature in a fume hood to allow the sulphur dioxide to escape. The distillate which was obtained as a light orange liquid was filtered through a short plug of basic alumina affording 2-bromomethyl-1,3-butadiene as a clear liquid. 10.10 g (67 percent yield) $^1$H NMR (300 MHz, CDCl$_3$): 6.34 (dd, 1H), 5.5–5.2 (m, 4H), 4.11 (s,2H); $^{13}$C NMR (75 MH$_z$): 30.65, 116.07, 120.30, 135.13, 142.49.

Preparation of 2-Chloromethyl-4-Methyl-1, 3-Pentadiene

A) Reduction of 3-Carboethoxy-5,5-Dimethyl-2,5-Dihydrothiophene

3-Carboethoxy-5,5-dimethyl-2, 5-dihydrothiophene (8.5 g, 0.046 mol) dissolved in dry tetrahydrofuran (100 ml) was placed in a 250 ml flask under a nitrogen atmosphere, and cooled in an ice-methanol bath to −10° C. Lithium aluminum hydride (0.90 g, 0.24 mol) was added slowly and the reaction mixture then stirred slowly for one hour before being quenched with saturated ammonium chloride (300 ml). The organic layer was removed and the aqueous layer was extracted with ether (150 ml×3), the organic layers dried over anhydrous magnesium sulfate, filtered, concentrated and chromatographed (support silica gel 60, 70–230 mesh; column size: 40×200 mm; eluant: 40 percent ether in petroleum ether (35°–60° C.); fraction size: 20 ml). The product, 3-hydromethyl-5, 5-dimethyl-2, 5-dihydro-thiophene, was obtained as a liquid from fractions 8 to 20. 5.10 g (78 percent yield). IR (neat) 3351, 2956, 1666, 1456, 1109, 1026 cm$^{-1}$; $^1$H NMR (300 MH$_z$, CDCl$_3$): 5.56 (S,1H), 4.19 (S,2H), 3.77 (S,2H), 2.0–1.9 (S,OH), 1.51 (S,6H); $^{13}$C NMR (75 MH$_z$, CDCl$_3$) 32.2, 38.1, 59.3, 61.5, 135.7, 138.9.

B) Chlorination of 3-Hydroxymethyl-5,5-Dimethyl-2,5-Dihydrothiophene

3-Hydroxymethyl-5,5-dimethyl-2,5-dihydrothiophene (5.10 g, 0.035 mol) was added to a solution of triphenyl phosphine (11.13 g, 0.042 mol) in carbon tetrachloride (150 ml). The solution was heated under reflux for sixteen hours, cooled, diluted with 150 ml petroleum ether (35°–60° C.), filtered and concentrated. Column chromatography (support silica gel 60, 70–230 mesh; column size: 25×300 mm; eluant: 10 percent ether in petroleum ether; fraction size: 10 ml) gave a mixture of triphenyl phosphine and the desired product in fractions 2 to 8. Kugle Rohr distillation gave 3-chloromethyl 5,5-dimethyl-2, 5-dihydrothiophene as a clear liquid. 3.53 g (61 percent yield) Bp=90°–100° C. /15 mm Hg; IR (neat): 2957, 1663, 1265, 693 cm$^{-1}$; $^1$H NMR (300 MH$_z$ 1.51(s,6H); $^{13}$C NMR (75 MH$_z$, CDCl$_3$): 32.0, 38.3, 42.5, 59.0, 135.0, 139.4.

C) Oxidation of 3-Chloromethyl-5, 5-Dimethyl-2, 5-Dihydrothiophene. (Method I)

3-Chloromethyl-5, 5-dimethyl-2, 5-dihydrothiophene (17.84 g, 0.11 mol) was dissolved in methylene chloride (1.5 l) and cooled in an ice bath while 50 percent m-chloroperoxybenzoic acid (75.7 g, 0.22 mol) was added with stirring. The bath was warmed to ambient temperature over three hours and the reaction mixture was checked by 1H NMR to ensure that the reaction was complete. The methylene chloride layer was washed with saturated sodium bicarbonate solution (400 ml×6) and then with water (400 ml). The methylene chloride layer was dried over anhydrous magnesium sulphate, filtered and concentrated to afford a mixture of the desired product and m-chlorobenzoic acid. The desired product, the sulphone was purified by column chromatography (support silica gel 60, 70–230 mesh; column size: 40×400 mm; eluants: ether-petroleum ether (35°–60° C.) mixtures; the eluant being changed from 20 percent ether to 40 percent ether in the petroleum ether. After two chromatographic passes, 3-chloromethyl-5, 5-dimethyl-2, 5-dihydrothiophene-1, 1-dioxide was obtained. 17.2 g (80 percent yield) Mp 59°–60° C.; $^1$H NMR (300 MH$_z$, CDCl$_3$): 5.98 (br s, 1H), 4.12 (s,2H), 3.82 (s.2H), 1.47 (s,6H); $^{13}$C NMR (75 MH$_z$, CDCl$_3$): 21.5, 43.1, 54.2, 64.1, 130.3, 134.7.

D) Oxidation of 3-chloromethyl-5,5-Dimethyl-2,5-Dihydrothiophene (Method II)

3-Chloromethyl-5,5-dimethyl-2,5-dihydrothiophene (3.50 g, 0.0215 mol) was dissolved in methylene chloride (150 ml) and cooled in an ice-bath while 80–85 percent (150 ml) and cooled in an ice-bath while 80–85 percent m-chloroperoxybenzoic acid (9.74 g, 0.056 mol) was added. The reaction was followed by $^1$H NMR and additional m-chloroperoxybenzoic acid (0.93 g, 0.005 mol) was added to ensure completion of the reaction. The suspension was filtered, the methylene chloride solution was washed with saturated sodium bicarbonate solution (50 ml×4), dried over anhydrous magnesium sulphate, filtered and concentrated, yielding 3- chloromethyl-5,5-dimethyl-2,5-dihydrothiophene-1,1-dioxide as a thick oil. 4.0 g (96 percent yield) IR (neat) 2977, 1461, 1305, 1199, 1116, 771, 696, 612

$cm^{-1}$. $^1$H NMR (300 $MH_z$, $CDCl_3$): 5.98 (s,1H), 4.12 (s,2H), 3.82 (s,2H), 1.47 (s,6H); $^{13}$C-NMR (75 $MH_z$, $CDCl_3$): 21.6, 43.1, 54.2, 64.2, 130.3, 134.8.

E) Pyrolysis of 3-Chloromethyl-5,5-Dimethyl-2,5-Dihydrothiophene-1,1-Dioxide

Kugle Rohr distillation of the sulphone (2.00 g, 0.010 mol) at an air bath temperature of about 150° C. and a pressure of about 130 to about 150 mm Hg afforded the product 2-chloromethyl-4-methyl-penta-1,3-diene as a light yellow liquid. 1.14 g (85 percent yield) IR (neat): 3091, 2973, 2933, 1654, 1629, 1444, 908, 745 $cm^{-1}$; $^1$H NMR (300 $MH_z$, $CDCl_3$): 5.66 (q, 1H), 5.32 (d, 1H), 5.00 (s,1H), 4.03 (d, 2H), 1.83 (d,3H), 1.81 (d,3H); $^{13}$C NMR (75 $MH_z$, $CDCl_3$): 19.6, 26.6, 49.9, 116.7, 122.4, 138.0, 141.8.

Example 1

Two random copolymerizations of isobutylene with 2-bromomethyl 1,3-butadiene were carried out in a dry box under a nitrogen atmosphere by charging screw-capped test tubes with specific amounts of each of a solvent, initiator 2,5-dimethyl-2,5-bis(benzoylperoxyhexane), isobutylene and 2-bromomethyl-1,3-butadiene at a temperature of about −70° C. Copolymerization was initiated by the addition of pure Lewis acid cocatalyst, in this instance a 1.0M solution of titanium tetrachloride in methylene dichloride (2.0 ml), and allowed to proceed for 45 minutes during which time the screw capped test tubes were periodically agitated manually. The copolymerizations were quenched by the addition of methanol (5 ml) to each test tube. The resultant copolymers were recovered by first partially removing the solvent under reduced pressure and then coagulating copolymers by the addition of methanol. The copolymers were characterized by 250 $MH_z$ $^1$H NMR spectroscopy and high pressure gel permeation chromatography using a Waters' instrument which was calibrated with narrow molecular weight distribution polystyrene standards, allowance being made for the fact the monomer being polymerized was isobutylene by using the polyisobutylene [K] and a values in the Mark-Houwink equation $[\eta]=KM^a$. The copolymerization parameters and the physical properties of the resultant copolymers are provided in Table I.

From the $^1$H NMR spectroscopic results in Table I it can be seen that while 2-bromomethyl-1,3-butadiene was incorporated into the polyisobutylene, it was at a low level.

Example 2

Two random copolymerizations of isobutylene with 2-chloromethyl-4-methyl-1,3-pentadiene were carried out using the same procedure as that described in Example 1. The copolymerization parameters and the physical properties of the resultant copolymers are provided in Table II.

From the $^1$H NMR spectroscopic results in Table II it can be seen that under the particular experimental conditions used copolymerization of isobutylene with 2-chloromethyl-4-methyl-1,3-pentadiene afforded a copolymer wherein the chlorinated monomer was incorporated at levels of up to 3.5 mole percent.

While not wishing to be bound by any theories, it is believed that 2-chloromethyl-4-methyl-1,3-pentadiene is incorporated into the copolymer to a greater extent relative to the incorporation of 2-bromomethyl-1,3-butadiene in part because of the stabilization afforded the intermediate allylic cation by the two methyl substituents on the olefinic bond that does not bear the allylic chloride functionality.

A preliminary study of the response of the chlorinated polymer to zinc oxide curing was then carried out using the following formulation and conditions.

Chlorinated polymer 3.0 g
Zinc Oxide 0.15 g
Stearic acid 0.06 g
Temperature 165° C.
Time 15 minutes Upon treatment in this manner it was found that the polymer was extensively cross-linked as evidenced by its lack of solubility in cyclohexane.

Example 3

Two random terpolymerizations of isobutylene with 2-chloromethyl-4-methyl-1,3-pentadiene and isoprene were carried out using the same procedure as that described in Example 1. The terpolymerization parameters and the physical properties of the resultant terpolymers are provided in Table III.

From the results in Table III it can be seen that under the particular experimental conditions used, terpolymers of isobutylene, isoprene and 2-chloromethyl-4-methyl-1,3-pentadiene were formed.

Example 4

Two random copolymerizations of isobutylene with 2-chloromethyl-3-methyl-1,3-pentadiene were carried out in a dry box under a nitrogen atmosphere by charging screw-capped test tubes with specific amounts of each of a solvent, initiator 1,4-di(2-methoxy-2-propyl)-benzene, isobutylene and 2-chloromethyl-4-methyl-1,3-pentadiene at a temperature of about −90° C. Copolymerization was initiated by the specific amount of titanium tetrachloride in methylene dichloride and allowed to proceed for 45 minutes during which time the screw capped test tubes were periodically agitated manually. The copolymerizations were quenched by the addition of methanol (5 ml) to each test tube. The resultant copolymers were recovered by first partially removing the solvent under reduced pressure and then coagulating polymers by the addition of methanol. The copolymers were characterized as in Example 1.

The copolymerization parameters and the physical properties of the resultant copolymers are provided in Table IV.

From the results in Table IV, it can be seen that under the particular experimental conditions used, copolymerization of isobutylene and 2-chloromethyl-4-methyl-1, 3-pentadiene took place readily with 2-chloromethyl-4-methyl-pentadiene being incorporated into the copolymer at a relatively high level. The results in Table IV taken in conjunction with the results in Table II demonstrate that isobutylene can be copolymerized with a conjugated diene bearing an allylic halide moiety in the presence of a catalyst system comprising a Lewis acid and an initiator having a structure wherein Y is a benzoylperoxy group or a methoxy group.

TABLE I

| | | |
|---|---|---|
| Isobutylene = | | $4.46 \times 10^{-1}$ mol |
| 2-Bromomethyl-1-3-butadiene | = | Expt #1 |
| | | $1.36 \times 10^{-2}$ mol |
| | = | Expt #2 |
| | | $3.40 \times 10^{-2}$ mol |
| 2-5-Dimethyl-2,5-bis(benzoyl- | | Expt #1 |
| peroxy)hexane | = | $1.0 \times 10^{-3}$ mol |
| | = | Expt #2 |
| | | $5.0 \times 10^{-4}$ mol |
| Titanium tetachloride = | | $2.0 \times 10^{-3}$ mol |
| Solvent | = | Expt #1 |
| | | Methyl chloride (150 ml) + hexane (150 ml) |
| | = | Expt #2 |
| | | Methyl chloride (250 ml) + hexane (250 ml) |

Brominated

TABLE I-continued

| Expt. # | Conv. % | Mn | Mw/Mn | Monomer (mole %) | # of Brominated[1] Monomers/chain |
|---|---|---|---|---|---|
| 1 | 60 | 10,850 | 2.0 | 0.6 | 1.15 |
| 2 | 40 | 15,600 | 2.5 | 0.85 | 2.3 |

[1]The number of units of brominated monomer per polymeric chain was calculated in the following manner.
Average molecular weight of repeating unit = moles of isobutylene × molecular weight of isobutylene + moles of halogenated monomer × molecular weight of halogenated monomer $$\text{Average number of repeating units per polymeric chain} = \frac{\text{Number average molecular weight of copolymer}}{\text{Average molecular weight of repeating unit.}}$$

Number of repeating units per polymeric chain = Average number of repeating units per chain × moles of halogenated monomer

TABLE II

| Isobutylene = | $8.93 \times 10^{-2}$ mol |
|---|---|
| 2-Chloromomethyl-4-methyl-1,3-pentadiene = | Expt #3 $4.60 \times 10^{-3}$ mol |
| | Expt #4 $2.30 \times 10^{-3}$ mol |
| 2,5-Dimethyl-2,5-bis(benzoyl-peroxy)hexane = | $1.6 \times 10^{-4}$ mol |
| Titanium tetrachloride = | $4.0 \times 10^{-4}$ mol |
| Solvent = | Methyl chloride (60 ml) + hexane (40 ml) |

| Expt. # | Conv. % | Mn | Mw/Mn | Chlorinated Monomer (mole %) | # of chlorinated[1] Monomers/chain |
|---|---|---|---|---|---|
| 3 | 50 | 16000 | 1.5 | 3.5 | 9.5 |
| 4 | 75 | 20600 | 1.4 | 1.2 | 4.3 |

[1]The number of units of chlorinated monomer per polymeric chain was calculated in the same manner as described in Example 1.

TABLE III

| Isobutylene = | | | $8.93 \times 10^{-2}$ mol |
|---|---|---|---|
| 2-Chloromomethyl-4-methyl-1,3-pentadiene | = | Expt #5 | $6.90 \times 10^{-3}$ mol |
| | = | Expt #6 | $3.07 \times 10^{-3}$ mol |
| Isoprene | = | Expt #5 | $4.41 \times 10^{-3}$ mol |
| | = | Expt #6 | $8.82 \times 10^{-3}$ mol |
| 2,5-Dimethyl-2,5-bis(benzoylperoxy)hexane | | | $2.5 \times 10^{-3}$ mol |
| Titanium tetrachloride = | | | $4.0 \times 10^{-4}$ mol |
| Solvent = | | | Methyl chloride (30 ml) + hexane (20 ml) |

| Expt. # | Conv. % | Mn | $M_w/M_n$ | Chlorinated Monomer (mole %) | # of Chlorinated Monomers/chain | Isoprene (mole %) | # Isoprene Monomers/chain |
|---|---|---|---|---|---|---|---|
| 5 | 90 | 8520 | 1.75 | 2.1 | 3.1 | 2.6 | 3.8 |
| 6 | 85 | 6030 | 2.0 | 0.6 | 0.6 | 3.0 | 3.2 |

TABLE IV

| Isobutylene | Expt. 1 = $4.46 \times 10^{-1}$ mol |
|---|---|
| | Expt. 2 = $8.92 \times 10^{-2}$ mol |
| 2-Chloromomethyl-4-methyl-1,3-pentadiene | Expts. 1 & 2 = $1.53 \times 10^{-2}$ mol |
| 1,4-di(2-methoxy-2-propyl) benzene | Expt. 1 = $1.04 \times 10^{-3}$ mol |
| | Expt. 2 = $2.25 \times 10^{-4}$ mol |
| Titanium tetachloride | Expt. 1 = $2.5 \times 10^{-3}$ mol |
| | Expt. 2 = $1.5 \times 10^{-3}$ mol |
| Solvent | Expt. 1 = Methyl cyclohexane (60 ml) + methyl chloride (40 ml) |
| | Expt. 2 = Methyl cyclohexane (30 ml) + methyl chloride (20 ml) |

| Expt. # | Mn | $M_w/M_n$ | Chlorinated Monomer (mole %) | # of Chlorinated Monomers/chain |
|---|---|---|---|---|
| 1 | 1865 | 1.8 | 1.6 | 5.22 |
| 2 | 17820 | 1.9 | 2.8 | 8.60 |

The number of chlorinated monomers per polymeric chain was calculated in the following manner.
Average molecular weight of repeating mix = moles of isobutylene in polymer × molecular weight of isobutylene + moles of chlorinated monomer in polymer × molecular weight of chlorinated monomer $$\text{Average number of repeating} = \frac{\text{Number average molecular weight of copolymer}}{\text{Average molecular weight of repeating unit.}}$$

Number of repeating units per polymeric chain = Average number of repeating units per chain × moles of chlorinated monomer

What is claimed is:

1. A process for the preparation of a halogenated polymer analogous to halogenated butyl rubber comprising the steps of:

(A) introducing into a suitable reaction vessel a monomer charge consisting essentially of from about 80 to about 95 weight percent of isobutylene and from about 5 to about 20 weight percent of a conjugated diolefin bearing an allylic halide moiety characterized in that said conjugated diolefin bearing an allylic halide moiety has the formula

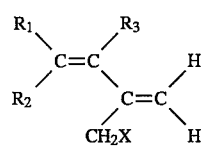

wherein $R_1$ and $R_2$ are selected from the group consisting of hydrogen and methyl groups and may be the same or different and $R_3$ is hydrogen and X is selected from the group consisting of chlorine and bromine, based on a total of 100 weight percent of said isobutylene and conjugated diolefin bearing an allylic halide moiety, and an initiator having the formula

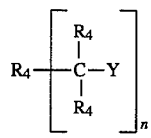

wherein each $R_4$ may be the same or different and is an alkyl, aryl or aralkyl group of 1 to 8 carbon atoms, Y is a carboxyl, alkoxyl, hydroxyl or halogen group and n is a positive whole number from 1 to 3, in an amount of from about $1 \times 10^{-5}$ to about $1 \times 10^{-3}$ moles per mole of said isobutylene at a temperature of from about $-90°$ C. to about $-10°$ C., (B) adding a solution of from about $1 \times 10^{-4}$ to about $5 \times 10^{-2}$ moles of a Lewis acid per mole of isobutylene in an organic solvent to the reaction mixture of (A) at said temperature and polymerizing the monomers to form said halogenated polymer, and (C) recovering the halogenated polymer from the solution.

2. A process of claim 1 wherein the conjugated diolefin bearing the allylic halide moiety is selected from the group consisting of 2-chloromethyl-4-methyl-1,3-pentadiene and 2-bromomethyl-4-methyl-1,3-pentadiene.

3. The process of claim 1 wherein the conjugated diolefin bearing the allylic halide moiety is 2-chloromethyl-4-methyl-1,3-pentadiene.

4. The process of Claim 1 wherein said initiator is selected from the group consisting of 1,4-di(2-methoxy-2-propyl)benzene, 1,3,5-tri(2-methoxy-2-propyl)benzene, 1,4-di(2-chloro-2-propyl)benzene, 1,3,5-tri(2-chloro-2propyl)benzene, 2,6-dichloro-2,4,4,6-tetramethylheptane, 1,4-di(2-hydroxyl-2-propyl)benzene and 2,6-dihydroxyl-2,4,4,6-tetramethylheptane.

5. The process of claim 2 wherein said initiator is selected from the group consisting of 1,4-di(2-methoxy-2-propyl)benzene and 1,3,5-tri(2-methoxy-2-propyl)benzene.

6. The process of claim 3 wherein said initiator is 1,4-di(2-methoxy-2-propyl)benzene.

7. The process of claim 1 wherein the Lewis acid is selected from the group consisting of boron trichloride, boron trifluoride, aluminum trichloride, stannic tetrachloride, titanium tetrachloride, antimony pentafluoride and vanadium tetrachloride.

8. The process of claim 7 wherein the Lewis acid is selected from the group consisting of boron trichloride and titanium tetrachloride.

9. The process of claim 1 characterized in that it is conducted in an inert organic solvent.

10. The process of claim 9 wherein said inert organic solvent is selected from the group consisting of $C_1$ to $C_4$ halogenated hydrocarbons, $C_5$ to $C_8$ aliphatic hydrocarbons, $C_5$ to $C_8$ cyclic hydrocarbons, mixtures of one or more said halogenated hydrocarbons and one or more said aliphatic hydrocarbons and mixtures of one or more said halogenated hydrocarbons and one or more said cyclic hydrocarbons.

11. The process of claim 10 wherein said inert organic solvent is selected from the group consisting of methyl chloride, methylene chloride, hexane, cyclopentane, methylcyclohexane and mixtures thereof.

12. The process of claim 1 wherein the organic solvent of step (B) is selected from the group consisting of methyl chloride and methylene chloride.

* * * * *